Oct. 4, 1949.                A. B. HILDEBRANDT                2,483,770
                      APPARATUS FOR SEISMIC PROSPECTING
Filed Dec. 22, 1945                                    2 Sheets-Sheet 2

INVENTOR.
Alexander B. Hildebrandt
BY
J. D. McKean
ATTORNEY.

Patented Oct. 4, 1949

2,483,770

UNITED STATES PATENT OFFICE 2,483,770

APPARATUS FOR SEISMIC PROSPECTING

Alexander B. Hildebrandt, Tulsa, Okla., assignor to Standard Oil Development Company, a corporation of Delaware Application December 22, 1945, Serial No. 637,054

2 Claims. (Cl. 177—352)

The present invention is directed to apparatus suitable for use in seismic exploration.

In conducting seismic operations it is often desirable to place a geophone or seismometer in a borehole to receive the seismic impulses. As an example of such operations, in determining the time required for seismic waves to travel vertically through the earth's formation, an explosive charge will be ignited adjacent a borehole and a geophone arranged in the borehole to receive the impulse produced by the explosive charge. Usually a series of determinations are made in the borehole using a series of explosive charges, the seismometer being moved along the bore of the hole to assume a different position for each explosive charge used.

It is an object of the present invention to devise a geophone arranged for making a positive contact between the case of the geophone and formations penetrated by a borehole.

When employing the present invention for determining velocities, a more reliable time measurement is attained for the first arrival of the seismic wave. The use of the present invention also enables a more reliable representation of the entire down-travelling wave group to be secured and makes for a better understanding of the seismic reflection phenomena obtained in the area.

The above-mentioned results are believed to be obtained principally by insuring a good contact between the seismometer case and the formations penetrated by the borehole. In addition, the present invention enables measurements to be obtained in a borehole with a slack cable between the geophone and the receiving and amplifying apparatus at the surface of the earth, thus eliminating the tremors which may pass down a taut cable. It will be understood, however, that other advantages may be inherent in the employment of the present invention and its operation and that I do not wish to be limited to the above-mentioned advantages or theories.

Preferred embodiments of the invention are shown in the drawing in which

Figure 1:
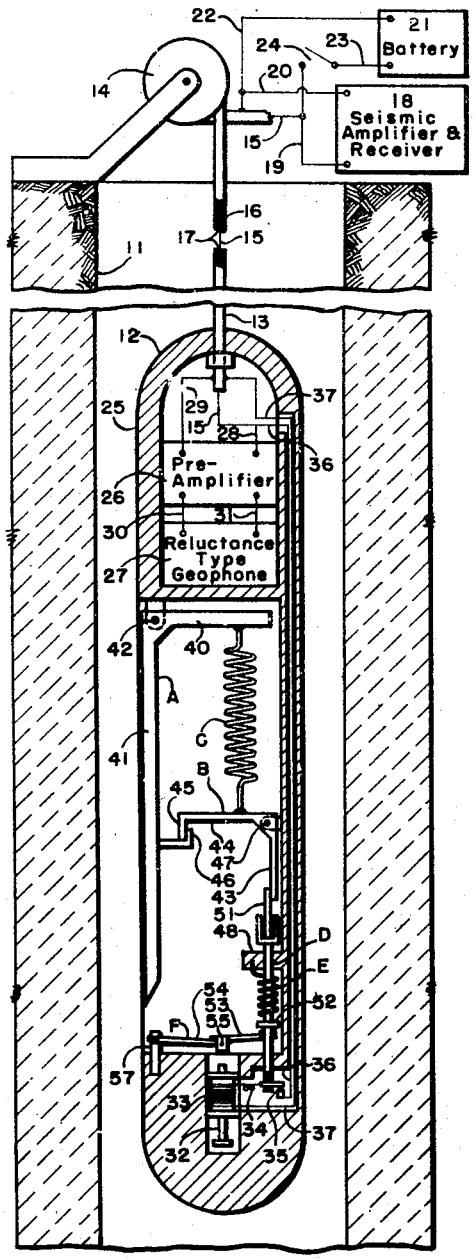
Fig. 1 shows a first embodiment arranged for free movement in the borehole.

Referring now specifically to the drawing and first to Fig. 1, a borehole 11 penetrates the earth. Within the borehole is a geophone designated generally by numeral 12 and attached to a cable 13 which serves to suspend the geophone in the well with the upper end of the cable suspended from a hoist 14. Cable 13 is illustrated as being constructed with a single central conductor 15, a metal sheath 16 and insulation 17 so that the conductor 15 may serve as one branch of a circuit and the metal sheath 16 as a ground or return for the circuit. A seismic amplifier and receiver 18 is arranged at the surface with one terminal connected to insulated conductor 15 through connection 19 and the other terminal connected to the metal sheath 16 by means of conductor 20. The construction of seismic amplifiers and receivers is well-known to the geophysical prospecting art and for this reason the seismic amplifier and receiver is not shown in detail but is indicated schematically by a rectangle. Also arranged at the surface is a battery 21 with one terminal connected to the cable sheath through conductor 22 and the other terminal connected to insulated conductor 15 of the cable by conductor 23 containing switch 24.

The geophone 12 suspended by cable 13 includes a casing or shell 25 in which is arranged a pre-amplifier 26, a reluctance-type geophone 27 and means adapted to be activated by a surge of direct current sent down insulated conductor 15 for locking the case 25 to the wall of the borehole. The construction of reluctance-type geophones and pre-amplifiers is well-known to the art and these parts of the apparatus are not shown in detail but are indicated merely by rectangles. In the drawing, one terminal of the pre-amplifier 26 is shown connected to insulated conductor 15 by conductor 28 and the other terminal is connected to metallic sheath 16 by conductor 29. The reluctance-type geophone 27 is connected to pre-amplifier 26 by conductors 30 and 31.

The means for locking the geophone 12 to the wall of the borehole may be adjusted to a first position to allow the geophone to be moved freely in either direction along the bore of the hole and may be released to a second position whereby the locking means secures the case 25 to the wall of the borehole. In the drawing, Fig. 1 shows the locking means in the first position to allow the free movement of the geophone along the wall of the borehole and Fig. 2 shows the locking means in its second position securing the case of the geophone to the bore of the hole.

The releasable mechanism for securing the geophone against the wall of the borehole includes a bent lever A, a second bent lever B, spring C, shaft D, spring E and pivoted lever F. This mechanism may be arranged by the operator at the surface of the earth to assume the first position shown in Fig. 1 and when the device has been lowered into the borehole in the desired position, it may be released from the surface to the position shown in Fig. 2 by a pulse of current sent down cable 13.

Openings are available in the case 25 so that the operator at the surface of the earth may set the mechanism by engaging the projection 45 on arm 44 with the projections 46 on each of the lever arms, as shown in Fig. 1, while pressing lever F into its bottom position, making sure that member 51 is in the position shown in Fig. 1.

Figure 2:
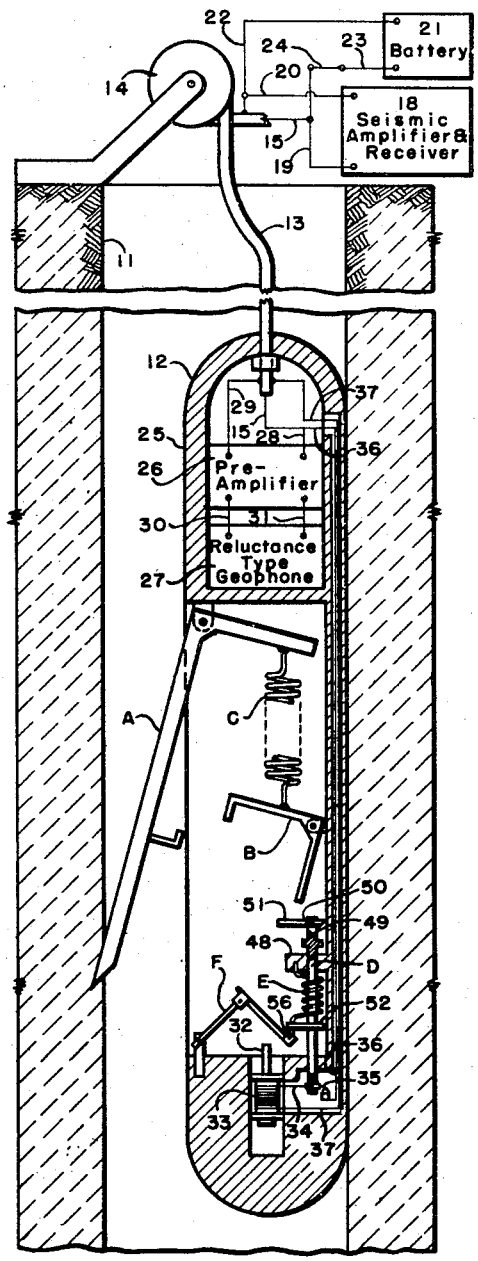
Fig. 2 illustrates the embodiment of Fig. 1 with its locking device in position to secure the geophone to the wall of the borehole.

The means for releasing the mechanism to the position shown in Fig. 2 is an armature 32 having its longitudinal axis vertically disposed and slidably arranged in coil of wire 33. One end of the coil of wire is connected through conductor 34, switch 35 and conductor 36 to insulated conductor 15 of cable 13 and the other end of the coil is connected through conductor 37 to metallic cable sheath 16. Upon the closing of switch 24 at the surface of the earth, a direct current is sent down cable 13; the major portion of the current passes through coil 33 rather than the pre-amplifier 26 because the impedance of the coil is low compared to the impedance across the output terminals of pre-amplifier 26. When the current passes through coil 33, armature 32 is drawn upwardly and strikes pivoted bar F thereby releasing the mechanism so that it may assume the position shown in Fig. 2.

The releasable locking means will now be described in greater detail. It will be seen that bent lever A is made up of a short arm 40 and a long arm 41 with the lever pivoted on a horizontally extending shaft 42. When the releasable locking means is in its first position, as illustrated in Fig. 1, arm 41 is vertical and extends downwardly and arm 40 is horizontal. The lower end of arm 41 is provided with a point in order to allow it to dig effectively into the wall of the borehole when the mechanism is released.

The second bent lever B consists of arm 43 and arm 44 which are at right angles with each other. The end of arm 44 is bent to form a projection 45 which is parallel with arm 43 and is adapted to engage with a projection 46 with which arm A of lever A is provided. Lever B is pivoted on horizontally extending pin 47. It will be seen that the upper end of spring C is secured to lever arm 40 and its lower end to lever arm 44.

Shaft D will be seen to have its axis arranged vertically and adapted for rotation about a journal or bearing 48 which is attached to case 25 of the geophone. The end of shaft D above journal 48 is provided with a seat 49 and pivoted thereto by horizontally extending shaft 50 is arm 51. It will be seen that the arm 51 and seat 49 are arranged so that the end of the upper end of the arm be turned downwardly through an angle of 90° by pressure applied against that face of the arm which is shown in Fig. 1 of the drawing, while pressure applied against any of the other faces of the arm cannot move arm 51 about shaft 50.

A lever 52 extending at right angles to the axis of shaft D is secured to the shaft some distance below journal 48. The upper end of spring E is attached to that portion of case 25 forming a support for journal 48 while the lower end of the spring is secured to arm 52; this arrangement of spring E exerts a bias on shaft D in the clockwise direction when shaft D is viewed from its lower end. Attached to the lower end of shaft D is switch 35 which is arranged to complete the circuit through coil 33 when the shaft is in the position shown in Fig. 1 and to break the circuit when the shaft has rotated about its axis to the position shown in Fig. 2.

Jointed bar F is constructed with arms 53 and 54 secured together by a pin or shaft 55. Arm 53 of jointed bar F is secured to lever arm 52 of shaft D by pin 56 while arm 54 is secured to the case 25 of the geophone by pin 57.

The mechanism may be released from the position shown in Fig. 1 to that of Fig. 2 in the following manner. Switch 24 at the surface of the earth is closed to send a pulse through coil 33. The passage of the current through coil 33 draws armature 32 upwardly and causes it to strike the center of bar F. As the pivot 55 of jointed bar F moves above the line joining the end pivots 56 and 57, the bar buckles under the bias exerted by spring E and allows shaft D to rotate through an angle of approximately 90°. As shaft D rotates it operates switch 35 to break the electrical connection through coil 33 and also rotates arm 51 through an angle of approximately 90° in the clockwise direction as viewed from the lower end of the device so that the pressure exerted by spring C through lever B on arm 51 will allow the upper arm to be bent down. As arm 51 is bent down, lever B is rotated above pivot 47 in the clockwise manner and withdraws projection 45 from contact with projection 46 of lever 8, the tension exerted by spring C on arm 40 of lever A then rotates lever A in the clockwise direction about pivot 42 and the lower pointed end of arm 41 is thrust against the wall of the borehole. Cable 13 may then be slackened to allow the weight of the assembly to rest on arm 41 of lever A and cause it to bite into the wall of the hole to lock the assembly firmly in position.

When the locking means has been released, as described above, and the geophone case is firmly secured to the wall of the borehole, the seismic determinations may be obtained. It will be understood that the seismic determinations will be made generally in the conventional manner with the seismic waves initiated some distance from the geophone and allowed to travel through the formations until they are received by the geophone. Methods for initiating seismic waves and for conducting seismic operations are well known to the art and will not be described in detail. It is to be emphasized that when the seismic waves are being received by the geophone, the cable 13 is slack so that the effect of extraneous waves which might otherwise be transmitted down to the cable or through the fluid of the hole is reduced or eliminated. It is also to be pointed out that the geophone assembly is securely attached to the wall of the borehole so that a tendency of the geophone assembly to fail to move with the wall of the hole is reduced or eliminated.

Although the geophone is locked tightly to the wall of the borehole by the locking means, it may be moved upwardly in the borehole by means of hoist 14 and cable 13. Determinations may be taken at any desired depth by lowering the device in the borehole to the lowest position at which measurements are to be taken, releasing the locking means, making the determination and then moving the geophone upwardly with measurements taken at each desired point in the borehole.

Figure 3:
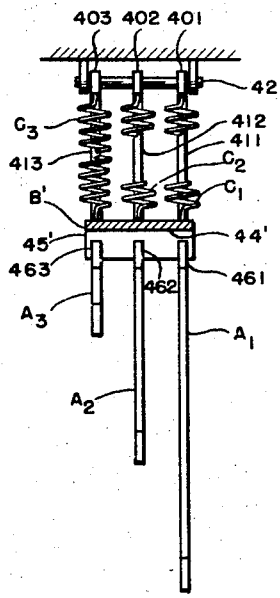
Fig. 3 is a fragmentary view illustrating another embodiment of the locking device of the present invention with the several parts in position to allow free movement of the geophone in the borehole.
Figure 4:
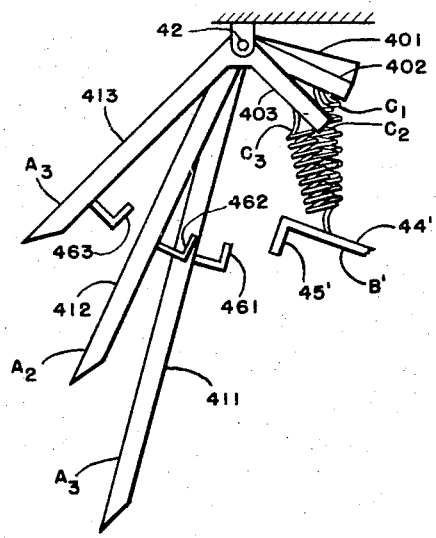
Fig. 4 is a view of the embodiment of Fig. 3 with the several parts of the locking device in position to engage the wall of the borehole.

Another embodiment of the present invention is shown in Figs. 3 and 4 in which a fragmentary view of a means for locking the geophone to the wall of the borehole is shown. It will be understood that the remainder of the apparatus, not shown in the drawing, may be identical with that of Figs. 1 and 2. The embodiment of Figs. 3 and 4 differs from that of Figs. 1 and 2 in being provided with a plurality of bent levers adapted for securing the geophone case to the wall of the hole. In the embodiment of Figs. 3 and 4, levers $A_1$, $A_2$ and $A_3$ are pivoted to geophone case 25 by horizontally extending pivot 42. It will be seen that these bent levers are generally similar to bent lever A of Figs. 1 and 2, with lever arms 401, 402 and 403 corresponding to arm 40 of lever A, arms 411, 412 and 413 corresponding to arm 41 of lever A and projections 461, 462 and 463 corresponding to projection 46 of lever A. While these three levers are generally similar in appearance, they differ in that arm 412 of lever $A_2$ is shorter than arm 411 of arm $A_1$ and arm 413 of lever $A_3$ is shorter than arm 412. In other words, the arms 411, 412 and 413 are progressively shorter in length.

It is usual for the diameter of boreholes to vary, due principally to the greater erosion of the softer formations under the influence of the circulating drilling fluid during the drilling of the well. The three arms 411, 412 and 413 are provided so that with the variations in diameter ordinarily encountered in a borehole at least one of the arms will be at a sufficiently steep angle to cause its end to dig into the formation and lock the geophone to the wall of the hole.

In the embodiment of Figs. 3 and 4, the levers $A_1$, $A_2$ and $A_3$ are secured in position with the arms 411, 412 and 413 vertical to allow the geophone to be moved easily into and out of the hole by securing the projections 461, 462 and 463 to projection 45' to lever B'; Fig. 3 shows arms $A_1$, $A_2$ and $A_3$ and lever B' in this relationship. It will be seen that projection 45' and arm 44' differ from projection 45 and arm 44 of lever B in the embodiments of Figs. 1 and 2 in being of considerable greater lateral extent; this lateral extension enables projection 45' to engage simultaneously with projections 461, 462 and 463 and provides a convenient means for attaching an end of each of the springs $C_1$, $C_2$ and $C_3$ to lever B'. It will be understood that lever B' may be released in the same manner as arm B of Figs. 1 and 2 and that upon releasing this lever arm the projection 45' is drawn upwardly by springs $C_1$, $C_2$ and $C_3$ and releases simultaneously levers $A_1$, $A_2$ and $A_3$. Fig. 4 shows the locking means with the projection 45' of lever B' disengaged from levers $A_1$, $A_2$ and $A_3$ to release them.

Having fully described and illustrated the present invention, what I desire to claim is:

1. In a geophone apparatus adapted to first move freely in a bore hole and adapted subsequently to be clamped at a desired point in the hole, a releasable clamping means comprising a first lever pivoted to the geophone apparatus, spring means associated with said first lever exerting a bias to force an end of the lever against the wall of the bore hole, a projection secured to the said first lever, a second lever positioned to engage the projection of the first lever, spring means associated with said second lever exerting a bias on the lever to cause the lever to disengage the said projection, a rotatable bar adapted to contact said second lever to prevent disengagement in one position and to permit disengagement in a second position, a coil of wire mounted in said geophone apparatus and an armature slideably mounted in said coil and arranged to move from a first to a second position upon the flow of current through the said coil, said armature being adapted in the said first and second positions to control the rotation of the rotatable bar.

2. In a geophone apparatus for seismic prospecting, including a geophone case adapted for vertical movement in a bore hole and for subsequent clamping at a desired point in the hole, a releasable clamping means comprising a first lever pivotally mounted on said geophone case so that it is free to assume a first position in which one end of said lever extends downwardly and is adjacent to the geophone case and a second position in which said lever extends outwardly from said geophone case in a manner adapted to force the end of said lever against the wall of the bore hole, a projection secured to said first lever, means biasing said first lever from its first position to its second position, a second lever positioned to engage said projection on said first lever, means biasing said second lever to disengage said projection, releasing means associated with said second lever and adapted to assume a first position which opposes disengagement of said second lever from said projection and to assume a second position which permits said disengagement, and electromagnetic means adapted to move said releasing means from its first position to its second position upon the flowing of an electric current through said electromagnetic means.

ALEXANDER B. HILDEBRANDT.

REFERENCES CITED

The following references are of record in the file of this patent:

UNITED STATES PATENTS

| Number | Name | Date |
|---|---|---|
| 542,664 | Thomson | July 16, 1895 |
| 1,258,834 | Waitz | Mar. 12, 1918 |
| 2,173,532 | De Long | Sept. 19, 1939 |
| 2,191,121 | Slichter | Feb. 20, 1940 |
| 2,252,620 | De Long | Aug. 12, 1941 |
| 2,281,960 | Vacquier | May 5, 1942 |
| 2,327,023 | Danner | Aug. 17, 1943 |
| 2,344,598 | Church | Mar. 21, 1944 |
| 2,428,168 | Loper | Sept. 30, 1947 |